(12) United States Patent
Skaarup

(10) Patent No.: US 6,439,854 B1
(45) Date of Patent: Aug. 27, 2002

(54) METHOD AND PUMP FOR IMPELLING WATER IN WATERS

(75) Inventor: Erik Skaarup, Gentofte (DK)

(73) Assignee: Waveplane International A/S, Gentofte (DK)

( * ) Notice: Subject to any disclaimer, the term of this patent is extended or adjusted under 35 U.S.C. 154(b) by 0 days.

(21) Appl. No.: 09/647,124
(22) PCT Filed: Mar. 23, 1999
(86) PCT No.: PCT/DK99/00158
§ 371 (c)(1), (2), (4) Date: Sep. 26, 2000
(87) PCT Pub. No.: WO99/48818
PCT Pub. Date: Sep. 30, 1999

(30) Foreign Application Priority Data

Mar. 26, 1998 (DK) .............................. 0430/98

(51) Int. Cl.[7] ............................................... F04B 19/24
(52) U.S. Cl. ........................................................ 417/53
(58) Field of Search ..................... 417/53; 210/512.1, 210/243; 290/53; 115/3.1; 415/7

(56) References Cited

U.S. PATENT DOCUMENTS

| | | | | |
|---|---|---|---|---|
| 1,476,229 A | * | 12/1923 | Suess | 415/7 |
| 1,673,605 A | * | 6/1928 | Tappan et al. | 415/7 |
| 2,783,392 A | * | 2/1957 | Corbiere | 415/7 |
| 3,754,147 A | * | 8/1973 | Hancock et al. | 290/53 |
| 4,172,689 A | * | 10/1979 | Thorsheim | 415/7 |
| 4,249,084 A | * | 2/1981 | Villanueva et al. | 290/53 |
| 4,357,543 A | * | 11/1982 | Penn | 290/53 |
| 4,390,426 A | * | 6/1983 | Vicard | 210/243 |
| 4,443,708 A | * | 4/1984 | Lapeyre | 290/53 |
| 4,469,596 A | * | 9/1984 | Kantor | 210/137 |
| 4,521,152 A | * | 6/1985 | Henrikson | 415/4.1 |
| 5,051,059 A | * | 9/1991 | Rademacher | 415/7 |
| 5,329,497 A | * | 7/1994 | Previsic et al. | 367/141 |
| 5,377,485 A | * | 1/1995 | Bellamy | 60/398 |
| 5,443,361 A | * | 8/1995 | Skaarup | 415/3.1 |
| 6,109,863 A | * | 8/2000 | Milliken | 415/1 |
| 6,133,644 A | * | 10/2000 | Smith et al. | 290/53 |
| 6,239,505 B1 | * | 5/2001 | Kao | 290/54 |
| 6,239,506 B1 | * | 5/2001 | Roskey | 290/55 |
| 6,270,558 B1 | * | 8/2001 | Theiler | 96/61 |

FOREIGN PATENT DOCUMENTS

| | | |
|---|---|---|
| JP | 63 042786 | 2/1988 |
| JP | 10 005791 | 1/1998 |
| SU | 1599321 A | 10/1990 |
| WO | WO93/09347 | 5/1993 |

* cited by examiner

Primary Examiner—Teresa Walberg
Assistant Examiner—Daniel Robinson
(74) Attorney, Agent, or Firm—McCormick, Paulding & Huber LLP

(57) ABSTRACT

A method for impelling water in e.g. a lake by with a pump transforming the waves of the lake into whirling water which is sent down towards the bottom of the water area. The pump comprises a horizontally extending whirl pipe with a longitudinal slot and at least one preferably curvedly extending baffle with a top front edge mainly facing a wave front in the lake in operation and a bottom rear edge extending along the slot. Both ends of the whirl pipe are fluid-connected to a submersible pipe extending down towards the bottom of the water area. The pump is simple and reliable as it functions without movable parts. The pump can without costs for external energy take surface water high in oxygen and atmospheric air down to enrich "dead" bottom water low in oxygen. At the same time the pump can advantageously be used for removing undesired constituents such as superfluous biomass from the lake and add desired additives such as lime to this.

9 Claims, 5 Drawing Sheets

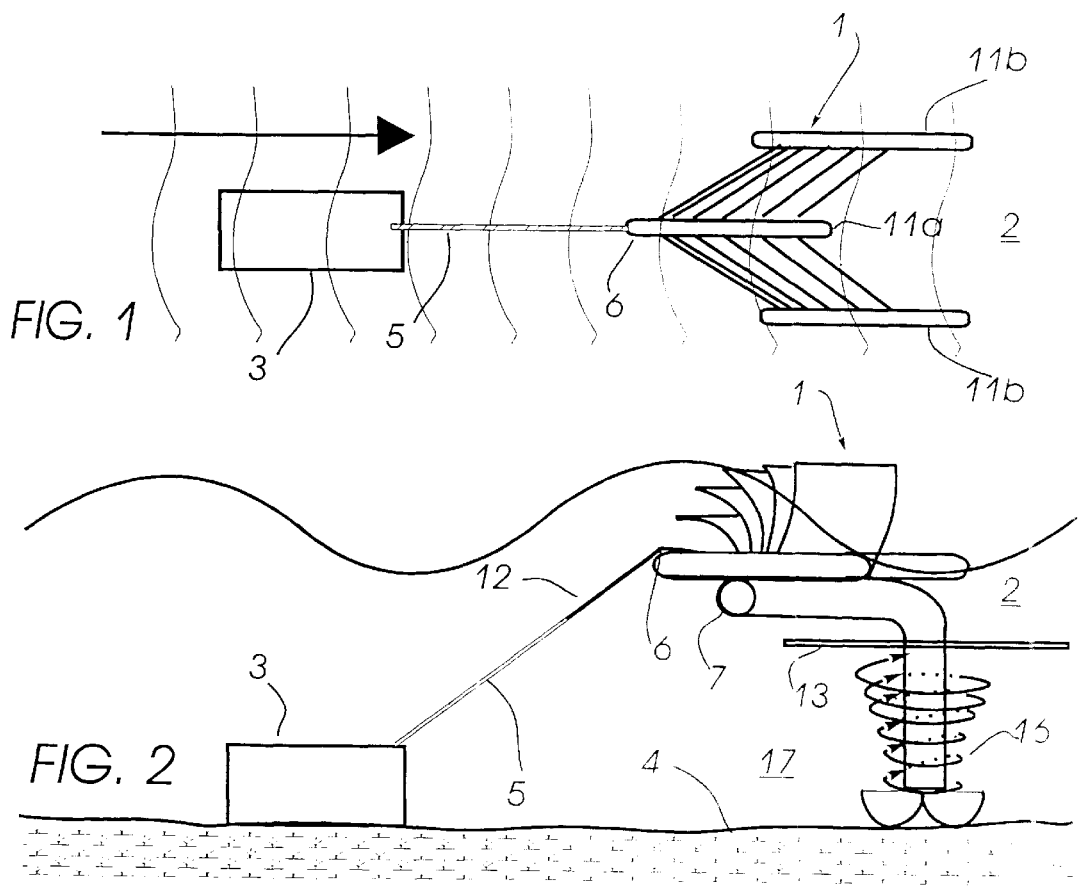
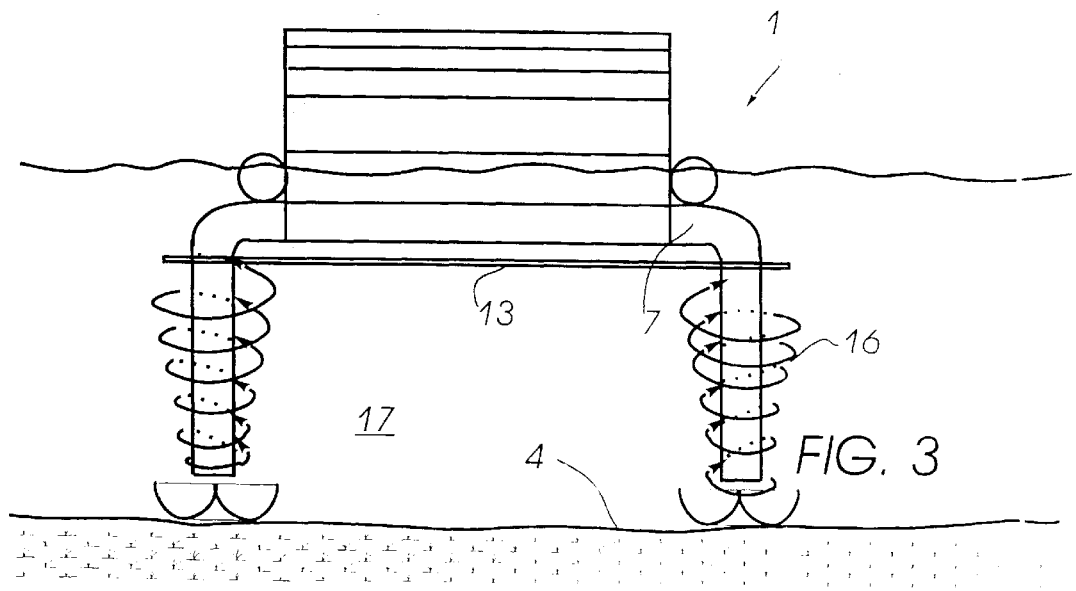

METHOD AND PUMP FOR IMPELLING WATER IN WATERS

FIELD OF THE INVENTION

The invention relates to a method for impelling water in a water area.

A water area e.g. a lake or a bay is not an isolated eco-system but is on the contrary very dependent on the conditions in the atmosphere and in the surrounding area from where the water area receives water.

With the precipitation, the water is thus added sulphuric acid, $H_2SO_4$ and nitric acid, $HNO_3$, which especially in lime-deficient water areas produce an environment in which plants and animals have difficult living. Furthermore, the degrading ability of the bacteria is reduced so that the amount of non-degraded organic substances in the form of humus compounds is increased.

The water flowing to the water area from the surrounding area often brings together with any discharges of waste water from urban areas large amounts of a number of nutrients in the form of e.g. nitrite and nitrate along with it whereby the biological activity of especially algae is increased substantially. Thereby, the visibility depth in the lake is reduced, and bottom plants begin to die out.

Concurrently with the death of the plant biomass in the bottom layers, the oxygen supply of the water area is reduced resulting in dead organic material not putrefying fully, and a layer of unputrefied organic material therefore settling on the bottom of the water area. The environment especially at the bottom of a water area can sometimes be so heavy strained that higher organisms no longer can survive. The water area is said to be "dead".

The living conditions at the surface and bottom of especially a rather deep water area with a thermocline between a top, warm zone and a bottom, cold zone can however be very different. Thus, oxygen will frequently be plentiful at the surface even though the water at greater depths will be low in oxygen. This phenomenon occurs especially in periods of formation of thermoclines where there is not sufficient wind to effectively set the water in motion.

With a view to set this problem right, attempts have been made to impel such water areas artificially by means of mechanical pumps driven by electric current or by internal combustion engines. However, the employment of this kind of energy to treat often very large volumes of water is disproportionately expensive and to this should be added that the employed equipment which in any case are operating with movable machine parts is liable to operational failure and therefore require inspection and maintenance often under difficult conditions at sea. The method has therefore not spread appreciably.

SUMMARY OF THE INVENTION

The object of the invention is to provide a method and a pump of the kind mentioned in the opening paragraph, which is simple and reliable, and which is arranged to impel water without costs for external energy.

A second object of the invention is to employ the impelling process to remove predetermined constituents from the water.

A third object of the invention is to employ the impelling process to add desired additives to the water.

This is achieved by means of the novel and unique features according to the invention whereby waves in the surface region of the water area are transformed to whirling water in the form of two swirls which is led down towards the bottom of the water area.

The whirling water advantageously serves for enriching underlying regions which are low in oxygen with oxygen from the surface water which is high in oxygen and atmospheric air which the waves have brought along with them. As the whirling water has a considerably higher velocity and a correspondingly larger energy content than a corresponding non-whirling water flow, the surface water is mixed with the bottom water especially efficiently.

The invention also relates to a pump for performing the above method. The pump comprises at least one horizontally extending whirl pipe submerged in the water area and having a longitudinal slot, and at least one preferably curvedly extending baffle which has a top front edge facing a wave front which might occur in the surface region of the water area, and a bottom rear edge extending along the slot. Water which in the form of waves flows in towards the at least one baffle is led via the longitudinal slot tangentially into the whirl pipe whereby the water is set in heavy rotation in a way known per se so that the water will form a whirl in the whirl pipe.

The novel and unique features according to the invention is that the ends of the whirl pipe each is fluid-connected to a submersible pipe extending towards the bottom of the water area. The submersible pipe serves for conducting the whirl in the whirl pipe down to the region which is desired to be mixed with surface water high in oxygen and atmospheric air.

The pump according to the invention has a simple construction and functions without movable parts. It is therefore reliable and for long periods of time does not require inspection and maintenance. The impelling process passes off without use of external energy and consequently heavy running costs. Only the present kinetic and potential energy available in the waves is used for the impelling process.

A flowing whirl has the peculiar characteristic that it relatively easy can change direction without significant to loose energy or to change structure. This advantage is best maintained when the whirl pipe and the submersible pipe are interconnected by a bending allowing the whirl to change direction without thereby causing turbulence in the rotating water.

Under the bottom mouth of the submersible pipe, a barrier can advantageously be placed in the form of bowl with a wall which, seen in cross section, curvedly passes into an upwardly directed central point. The bowl reverses the out flowing water of the whirl so that the water flows upwards in stead of down into the bottom where it could cause damage by unwantingly whirling the bottom material up and thereby pollute the water.

A water area can have a considerable horizontal extend. In order to get the bottom water in areas at a large horizontal distance from the pump mixed with surface water high in oxygen, the bottom part of the submersible pipe can be bent in relation to the plumb line. Thereby, the whirl is given a velocity component which causes the whirl to begin travelling towards the mentioned areas.

When there are two whirls with opposite directions of rotation and when the bottom parts of these whirls both rotate in the same direction as the water is moving on opposite sides of the whirls, the whirls will repel each other so that the water across a very large bottom area is enriched with oxygen.

The rotation of the water in the submersible pipe causes heavy constituents to be flung out towards the wall of the pipe while light constituents will move in towards the centre of the pipe. By at a wanted level connecting the submersible pipe to a removal pipe led into a specific layer in the whirl, this layer can be completely or partly removed from the down flowing surface water.

An unwanted biomass can thus be separated and via the removal pipe led to the surface where the water is strain off. Alternatively, the removal pipe can be connected to a filter bag placed in the water.

With several removal pipes led into each their layer in the whirl different constituents can selectively be removed from the water.

In an advantageous embodiment the whirl pipe can furthermore be fluid-connected to an intake pipe which is open at the top. When the intake pipe ends above the water surface, extra air in sucked into the whirl pipe due to the negative pressure in this pipe. Thereby, the whirl will directly draw atmospheric air down with it to enrich underlying water regions with oxygen.

The intake pipe can also be used for pouring additives down into the whirl pipe. For example lime which is used to change the pH value in e.g. acid lakes is then taken with the whirl down into the lake where the lime is effectively mixed with the acid water.

When the intake pipe ends below the water surface, the surface water is sucked into the whirl pipe which thereby via the submersible pipe sends extra large quantities of water high in oxygen down towards the bottom of the water area.

BRIEF DESCRIPTION OF THE DRAWINGS

The invention will be explained in greater detail below, describing only exemplary embodiments with reference to the drawing, in which FIG. 1 is a diagrammatic plan view of a launched pump according to the invention, FIG. 2 is a side elevational view of the pump in FIG. 1, FIG. 3 is a front view of the pump in FIG. 1.

DETAILED DESCRIPTION OF PREFERRED EMBODIMENTS

Figure 4:
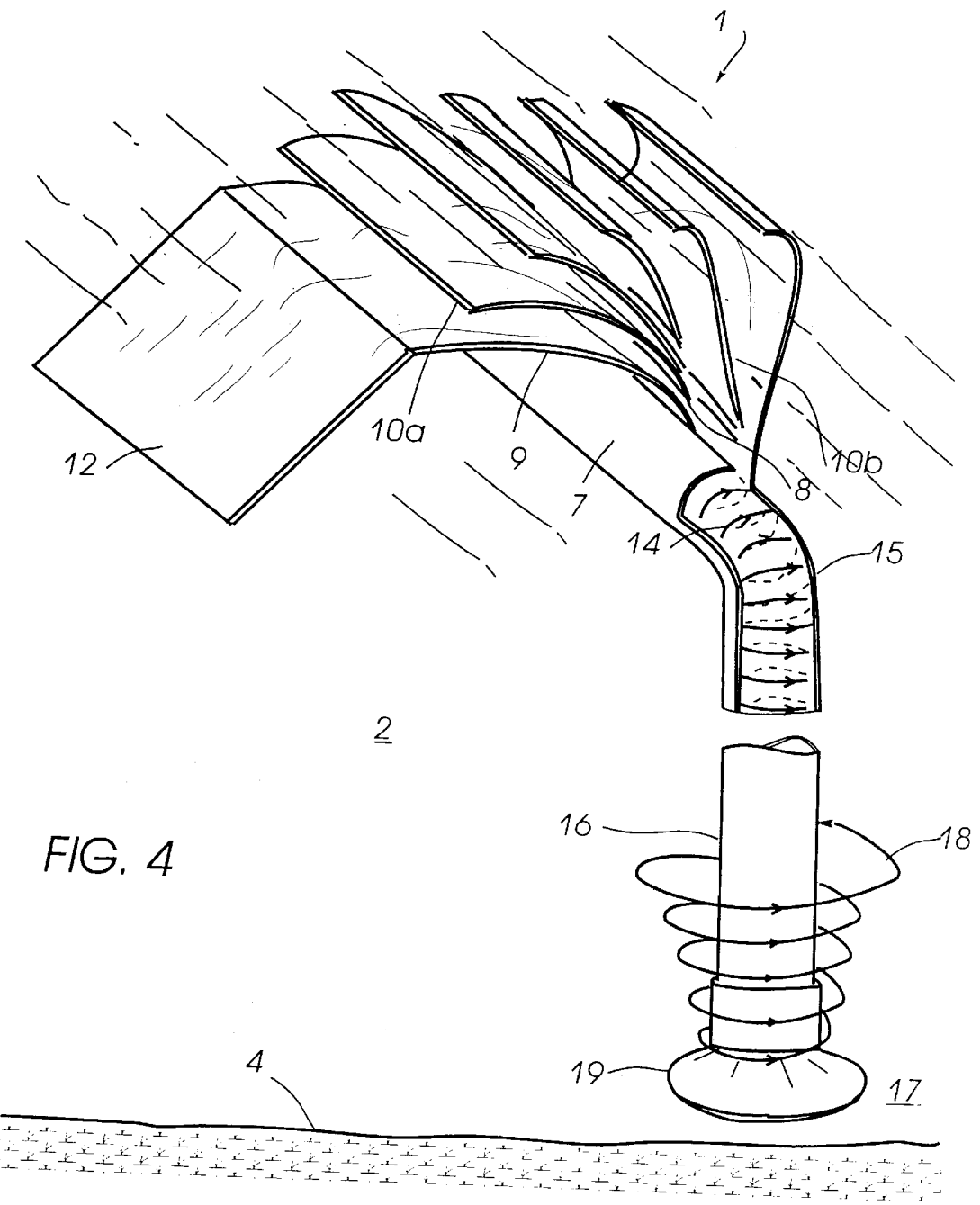
FIG. 4 is on a larger scale a diagrammatic perspective view of a fragment of the pump in FIG. 1—3.

FIGS. 1–3 show a pump 1 according to the invention floating in a water area 2. The pump is moored to an anchorage 3 on the bottom 4 of the water area by means of a mooring line 5. In the following, the water area is assumed to be a lake with "dead" bottom water low in oxygen.

As can be seen in FIG. 1, the pump is, seen from above, mainly shaped as a wedge, and the mooring line is fastened at the point of this wedge 6. This means that the pump will swing in such a way in the lake that the point always points towards a wave front.

As can be seen best in FIG. 4, the pump is built up around a mainly horizontally extending whirl pipe 7 which normally is at a distance below the water surface. A longitudinal slot 8 is made in the top side of the whirl pipe. The whirl pipe follows the same wedge-shape as the rest of the pump.

Along the whirl pipe 7 is furthermore a total number of six curved baffles 9 placed in a line after and above each other and each having a top front edge 10a facing obliquely forwards towards the wave front in normal operation, and a bottom rear edge 10b extending along the slot 8 of the whirl pipe. The lowest of the six baffles 9 continues into a ramp 12 extending obliquely downwards and towards the wave front.

In the case shown, the pump is carried in the water by means of a central pontoon 11a and two side pontoons 11b. Under the whirl pipe, the pump furthermore has a damping plate 13 with a relatively large area and placed so deeply that there on the whole are no waves.

Without the damping plate, the pump would be inclined to follow the movement of the passing waves. As the damping plate during a vertical movement of the pump only will be able to displace the very large quantities of water around the plate slowly, the pump will however not be able to follow the relatively high frequency of the waves.

The vertical position of the pump will therefore be relatively fixed in relation to the amplitude of the passing waves while the pump is able to follow e.g. the slow changes in water level due to the tide.

During operation, the top part of the waves sweeps across the pump while a lower part of the water runs up the ramp 12 and from there into the pump. The water then flows along the baffles 9 of the pump mainly tangentially into the whirl pipe 7 via the longitudinal slot 8 whereby a whirl 14 is formed in the whirl pipe with a energy content made up of the kinetic and potential energy of the waves.

The above technique is known from the applicant's European patent no. 0 611 418 which is included in this application as reference.

This known plant is a power plant serving for converting the energy of the waves into electric current or if occasion should arise into another expedient kind of energy. For this purpose, there is at each end of the whirl pipe 7 placed a turbine (not shown) that drive a generator (not shown). The whirl drives the turbine which returns the water of the whirl to the surroundings drained of energy and largely in a not-whirling state.

The pump according to the invention is a pump that serves for impelling water in the stream by means of the energy of the waves. The whirl 14 is in this case sent down towards the bottom 4 of the stream via a bend 15 and a submersible pipe 16 to a lower region 17 where it is let out in fully rotating state while maintaining its full energy content.

The whirl 14 therefore continues outside the submersible pipe 16 in an external, rising whirl 18 which sets the surrounding bottom water in motion. Thereby, the bottom water which is low in oxygen is mixed effectively with surface water which is high in oxygen and with atmospheric air drawn by the waves into the pump.

As can be seen, the water is in this way pumped around in the water area, the external rising whirl 18 always leading just as much bottom water up to the surface of the water as the internal whirl 14 is leading down towards the bottom of the water area.

Figure 5:
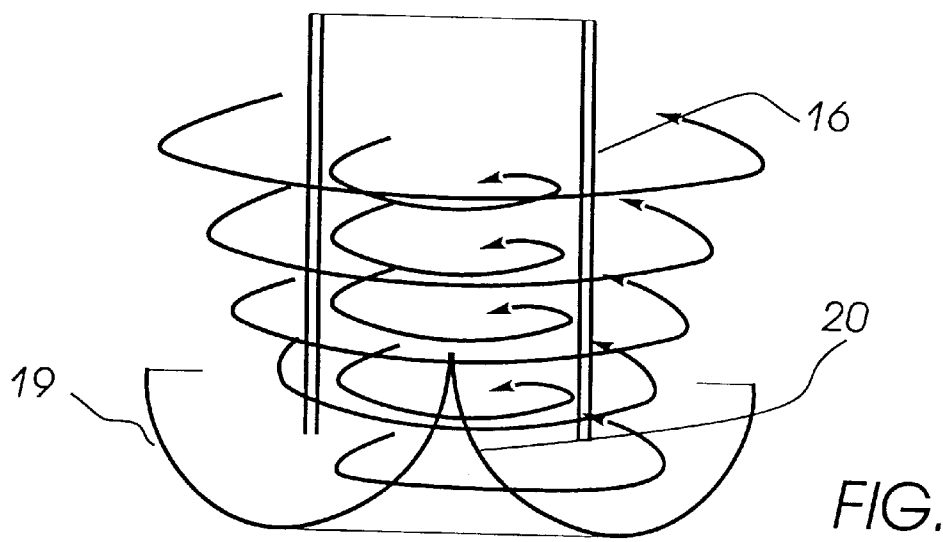
FIG. 5 is a side elevational view and partly in longitudinal section of the lower end of a submersible pipe belonging to the pump with an underlying barrier.

When the water in the whirl 14 is flowing down towards the bottom, there is a risk that the whirl might undesiredly stir bottom material such as mud up. In order to avoid this disadvantage, a bowl 19 is, as shown in FIG. 5, placed under the bottom mouth of the submersible pipe. From the periphery, the wall of this bowl passes in a surface of revolution of double curvature gradually into an upwardly directed central point 20. Due to this particular embodiment, the bowl makes the descending internal whirl 14 turn around into the rising external whirl 18.

Figure 6:
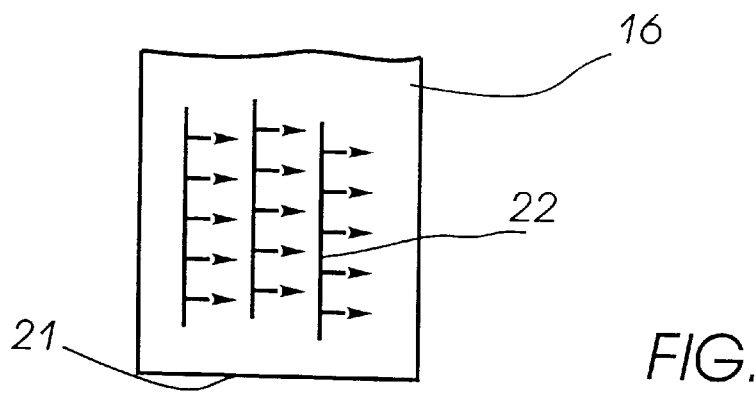
FIG. 6 is a side elevational view of a second embodiment of the lower end of the submersible pipe.
Figure 7:
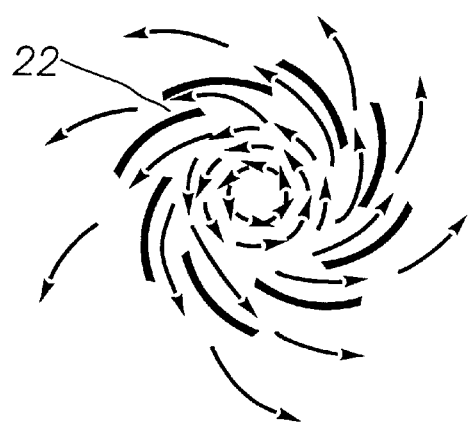
FIG. 7 is a cross-sectional view of the pipe in FIG. 6.

FIGS. 6 and 7 show a second embodiment of the lower end part of the submersible pipe. In this construction, the submersible pipe is at the bottom closed with a bottom 21 while the end part of the submersible pipe is provided with longitudinal gills 22 which with increased speed let the surface water which is high in oxygen of the internal whirl 14 out into the surrounding bottom water. Thereby, an effective stirring of the bottom water is ensured within a relatively large radius of the submersible pipe.

Figure 8:
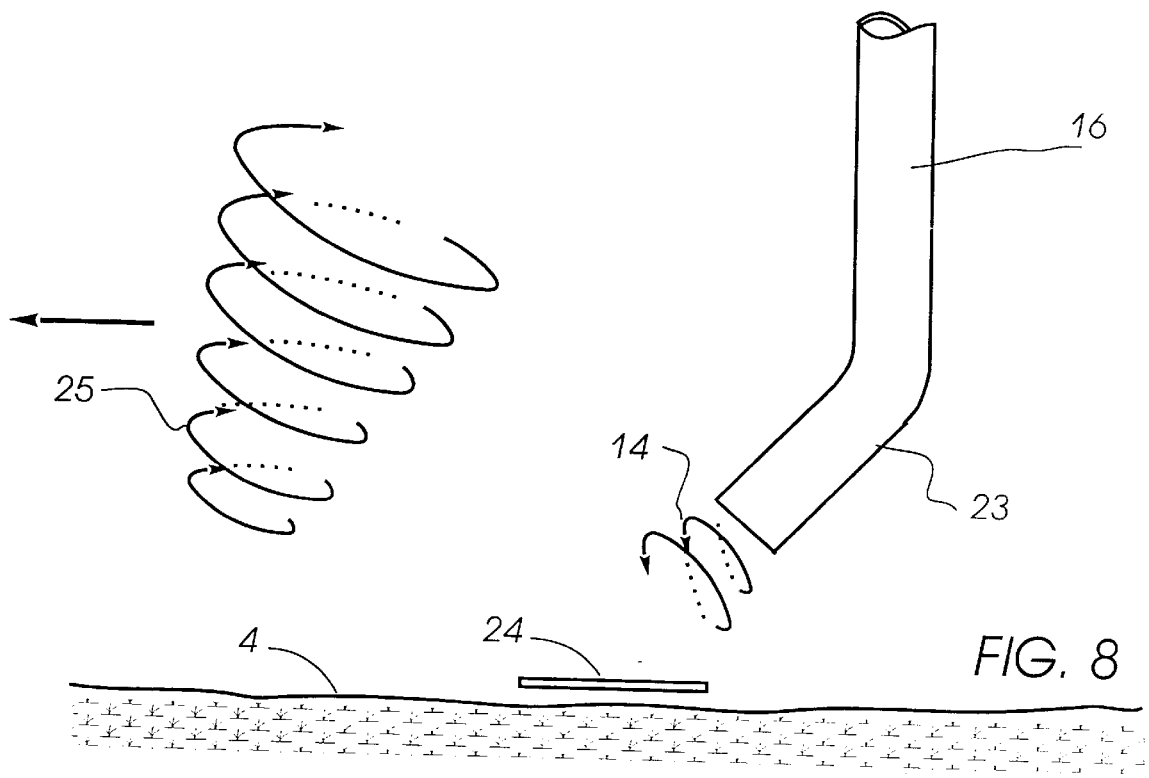
FIG. 8 is a side elevational view of a third embodiment of the lower end of the submersible pipe and a travelling whirl.

In FIG. 8, the lower end part 23 of the submersible pipe 16 is bent forwardly towards a bottom area which desiredly is to be enriched with oxygen. Under the mouth of the submersible pipe is placed a barrier 24 for preventing the whirl from stirring the bottom of the water area up. The obliquely forwardly directed direction of the end part gives the out flowing whirl 14 a velocity component which causes trains of disconnected whirls to be formed that in the direction of the arrow successively travel towards the mentioned area. FIG. 8 shows one of these whirls 25. During the travelling, the whirl is affected by a hydrodynamic transverse force which makes the whirl travel along a curved path.

Figure 9:
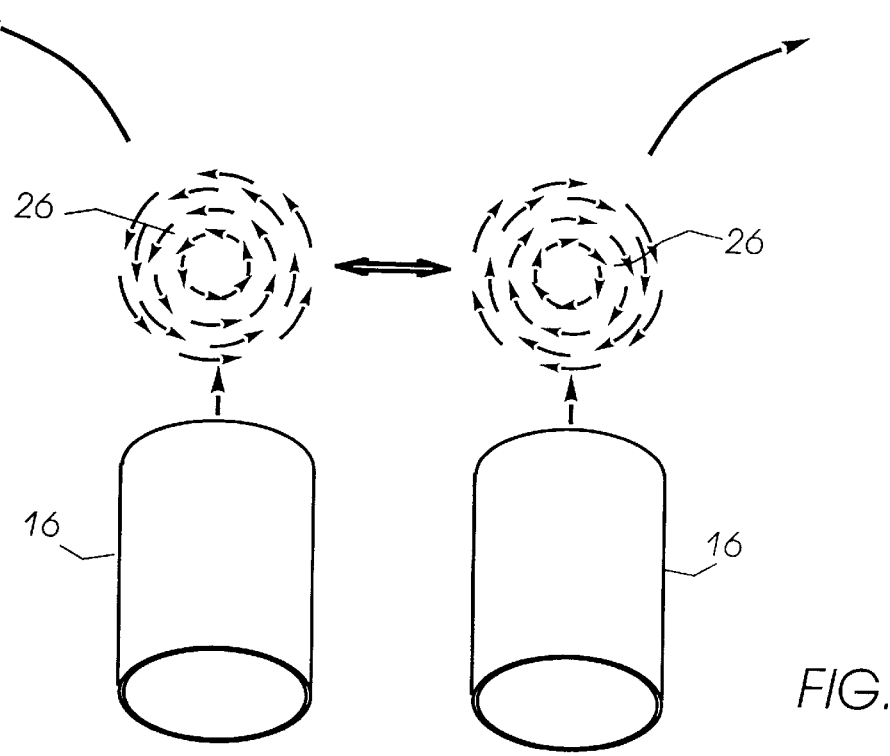
FIG. 9 is a plan view of two submersible pipes of the kind shown in FIG. 8 placed next to each other and two travelling whirls.

In the pump shown in FIGS. 1–4, the whirl pipe 7 is at both ends connected to a submersible pipe 16 each forming a whirl 26. This situation is illustrated in FIG. 9 where the end parts of both submersible pipes 16 are bent in the way described above with reference to FIG. 8. The hydrodynamic transverse force forces the whirls 26 to drift apart in the direction of the arrows. The travelling whirls have the effect of enriching the "dead" bottom water with oxygen across a very large area.

Figure 10:
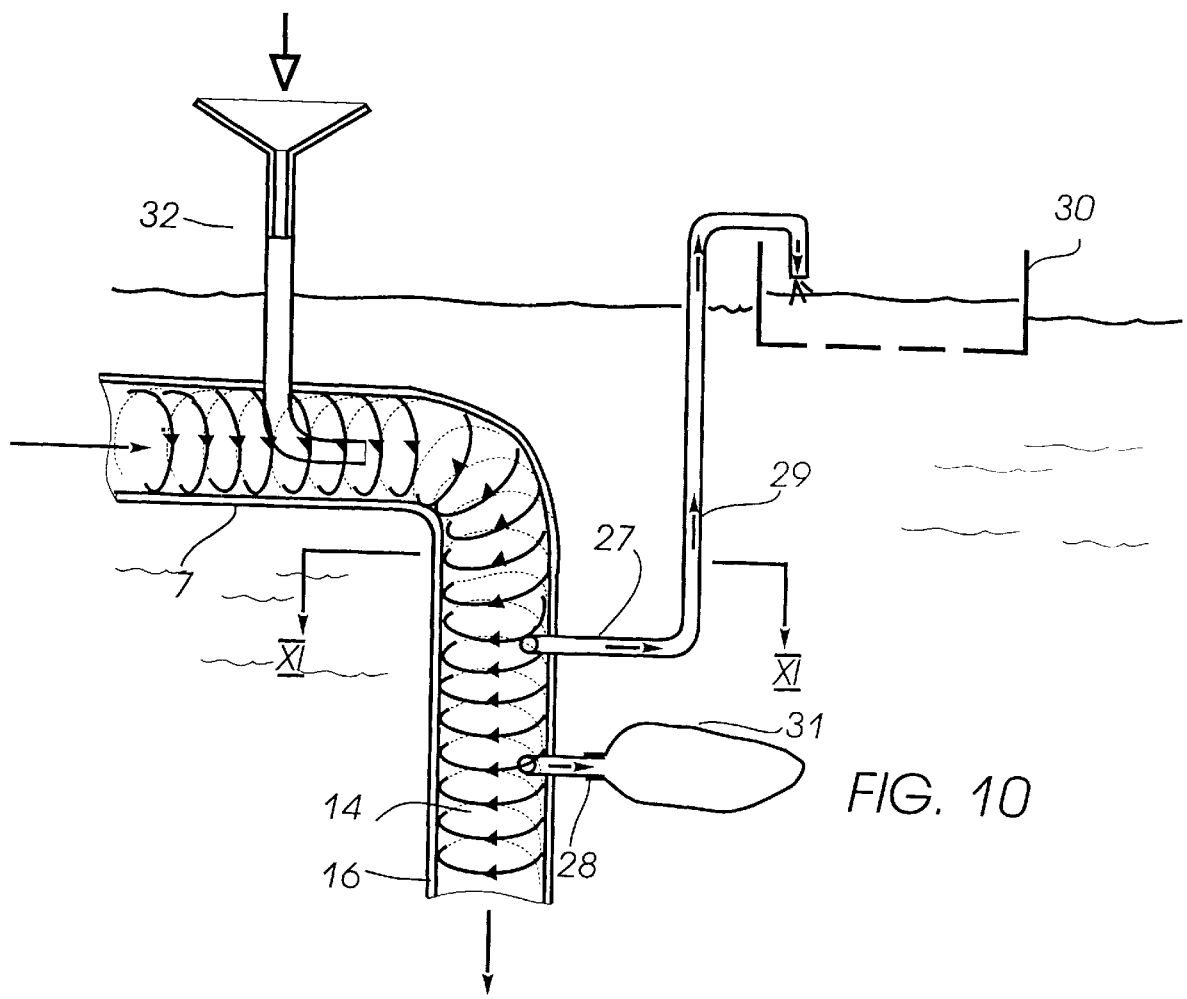
FIG. 10 is a fractional view of the submersible pipe connected to a whirl pipe belonging to the pump, and an intake connected to the whirl pipe, and two offtakes connected to the submersible pipe.
Figure 11:
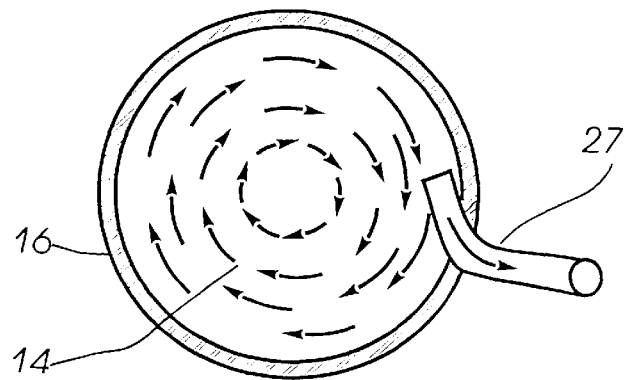
FIG. 11 is a sectional view taken along the line Xl—Xl of FIG. 10.

FIGS. 10 and 11 fragmentarily show the submersible pipe 16 connected to a first offtake 27 and a second offtake 28 respectively. Both offtakes are, as shown in FIG. 11, via the wall of the submersible pipe led into the internal whirl 14 with their open ends facing against the direction of rotation of the whirls.

The first offtake is connected to a riser pipe 29 extending above the water surface and ending in a reception tank 20 provided with a perforated bottom.

The gravitation in the rotating water will divide the constituents of the water into concentric layers according to density. A content of e.g. superfluous biomass in the lake will thus be set in a particular layer which is completely or partly removed when the open end of the offtake is in this layer. The biomass is taken by the riser pipe 29 to the reception tank 30 where the accompanying water is strained off. In this way, unwanted constituents can automatically be removed from the lake at the same time as bottom water of this lake is enriched with oxygen.

The second offtake 28 functions in the same way as the first 27, the unwanted constituents in the water in this case being collected in a filter bag 31 in stead of in the reception tank 30.

In FIG. 10 is also seen an intake 32 extending a distance above the surface of the water. Due to the negative pressure in the whirl pipe 7, atmospheric air is sucked via the intake 32 into the whirl 14 and with this via the submersible pipe 16 down into the bottom water which thereby is provided with extra large quantities of oxygen. The lower end of the intake is led into the axis of revolution of the whirl and bent forwardly in the flow direction whereby the intake effectively will function as intended.

If the lake is acid, the intake 32 can, as indicated with the arrow, advantageously also be used for pouring in lime which by means of the pump is effectively dispersed in the lake during the impelling process. Other desired additives can naturally be dispersed in the lake in the same way. For this purpose, the upper end of the intake is shaped as a funnel.

What is claimed is:

1. A method for impelling water in a water reservoir, wherein waves in a surface region of the water reservoir are transformed to whirling water in the form of two whirls which is led down towards a bottom of the water reservoir.

2. A pump for impelling water in a water reservoir and comprising at least one mainly horizontally extending whirl pipe preferably submerged in the water reservoir and having a longitudinal slot, and at least one preferably curvedly extending baffle which has a top front edge which, in operation, mainly faces a wave front which might occur in a surface region of the water reservoir, and a bottom rear edge extending along the slot, wherein the whirl pipe at least at one of the ends is fluid-connected to a submersible pipe extending down towards a bottom of the water reservoir.

3. A pump according to claim 2, wherein the whirl pipe is connected to the submersible pipe via a bend.

4. A pump according to claim 2, wherein a barrier is placed at a distance from a bottom mouth of the submersible pipe, and which is extending transversely to an axis of the pipe.

5. A pump according to claim 4, wherein the barrier is a bowl a wall of which from the periphery passes into an upwardly directed central point via a surface of revolution of double curvature.

6. A pump according to claim 2, wherein at least a lower end part of the submersible pipe forms an angle with a plumb line.

7. A pump according to claim 2 and where there are two submersible pipes, wherein at least lower end parts of each of these pipes form an angle with a plumb line, and that this angle orientates the same way as the water moves on opposite sides of the whirls.

8. A pump according to claim 2, wherein it comprises at least one offtake pipe communicating with a whirl in the submersible pipe so that a part of constituents of the whirl flows out through the offtake pipe.

9. A pump according to claim 2, wherein it comprises at least one intake pipe with an upper end ending freely in the surface region or in the atmospheric air above this, and a lower end fluid-connected to the whirl pipe or the submersible pipe.

* * * * *